UNITED STATES PATENT OFFICE.

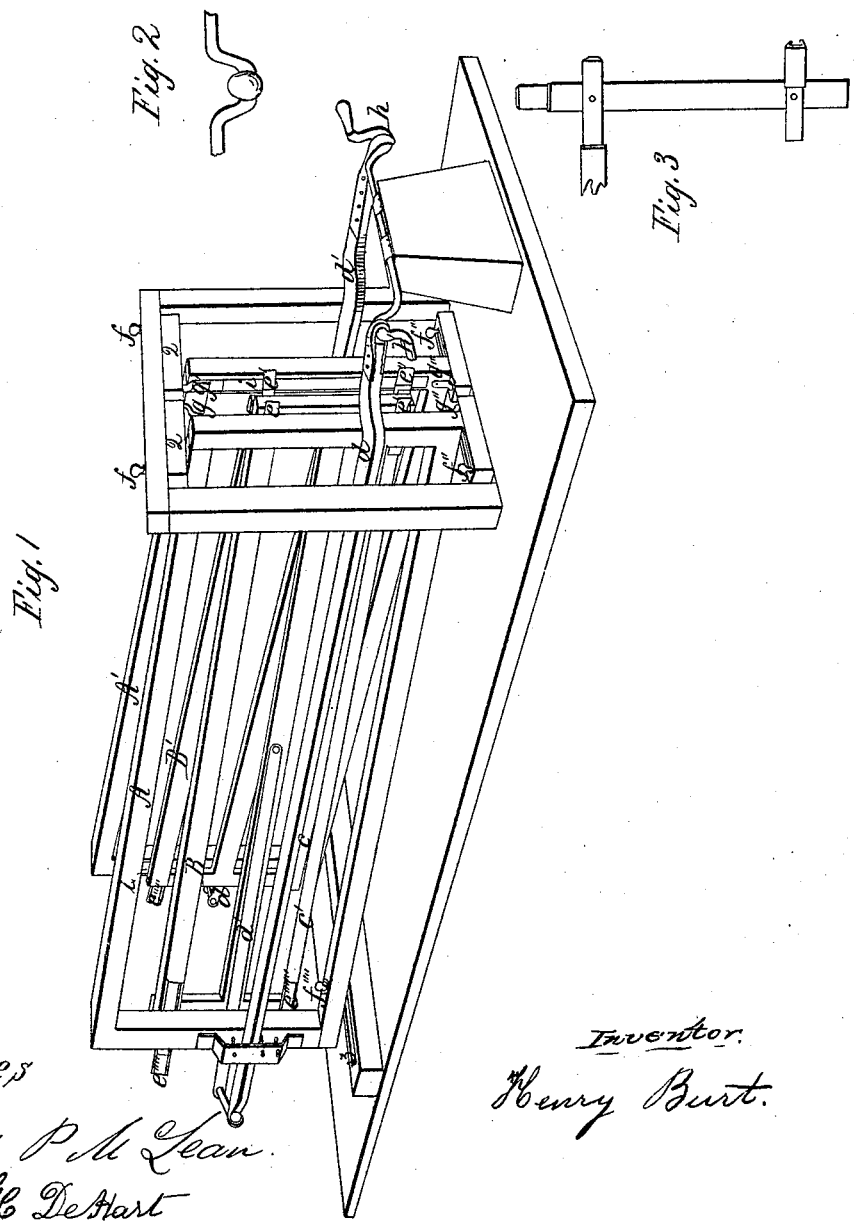

HENRY BURT, OF NEWARK, NEW JERSEY.

MACHINE FOR SAWING MARBLE.

Specification of Letters Patent No. 13,742, dated November 6, 1855.

*To all whom it may concern:*

Be it known that I, HENRY BURT, of the city of Newark, in the county of Essex and State of New Jersey, have invented a new and useful Machine for the Purpose of Sawing Stone into Wedge-Shaped, Diverging, or Angular Forms; and I hereby declare the following to be a full, exact, and clear description of the same, reference being had to the accompanying drawings, which drawings are lettered to correspond with and constitute a part of this specification.

The nature of my invention consists in the construction, and arrangement of a set of adjustable, pivoted, saw frame supports, which enable me to saw stone into any angular shape less than a right angle, cutting two diverging faces at the same time, or two saws will cut one side of a stone perpendicular to the base and the other side will form the hypotenuse of a right angle triangle.

To enable others to construct and use my machine I will go on to describe it—see drawings.

*Description.*—Figure 1, is a bird's eye view of my machine showing an oblique side, end, and part top drawing having the saws set in the position for cutting a wedge shaped block of stone diverging equally on each face. In order to illustrate the operation of my machine more fully I will next describe the process of sawing a pyramid or monument. After the stone is placed in a proper position for sawing I loosen the thumb (or set) screws ($f''''$) and swing the adjustable saw frame supports (A, A',) on their pivots ($g\ g'\ g''\ g'''$) to the desired angle; then tighten the screw ($f''''$) again. The machine is now ready for sawing and is set in motion by the revolving of the cranks ($h, h',$) that are in connection, with the connecting rods ($d, d',$) at the ball joints, (or crank).

*Description of drawings.*—Figure 1, letters (A A') represents the adjustable pivoted saw frame supports (B, B',) are the saw frame. ($c, c',$) are saws. ($d, d',$) are the connection rods. ($e\ e'\ e''\ e'''\ e''''\ e'''''\ e''''''$) are horizontal slides attached to the saw frames and to the vertical slides ($i, i',$) ($f, f', f'', f''', f''''$) are thumb (or set) screws to adjust the saw frame supports. ($g, g', g'', g''',$) are the pivots. ($h, h'$) are the cranks. ($i, i',$) are vertical slides that allow the saws to move up or down. Fig. 2, is a ball crank as shown at ($h, h',$) Fig. 1. Fig. 3. shows the vertical and horizontal slides.

I am aware that different adjustable apparatus have been used for sawing wood, and that horizontal saw frames have been used for sawing stone, into square blocks, parallelograms, thin slabs, &c., also connections of various kinds have been used for working saw frames.

I do not therefore claim the above devices separately, but

What I claim and desire to secure by Letters Patent of the United States, is—

The combination of the saw frames (B, B',) pivoted swinging adjustable guide frames (A, A',) and connection rods ($d, d',$) arranged and operated in the manner and for the purpose set forth.

In testimony whereof I hereunto subscribe my name in the presence of two witnesses.

HENRY BURT.

Witnesses:
 JAMES P. MCLEAN,
 WILLIAM H. DEHART.